(12) United States Patent
Olmstead et al.

(10) Patent No.: US 7,398,927 B2
(45) Date of Patent: Jul. 15, 2008

(54) DATA READER AND METHODS FOR IMAGING TARGETS SUBJECT TO SPECULAR REFLECTION

(75) Inventors: Bryan L. Olmstead, Eugene, OR (US); Larry James Smith, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 357 days.

(21) Appl. No.: 11/044,825

(22) Filed: Jan. 26, 2005

(65) Prior Publication Data

US 2006/0163355 A1    Jul. 27, 2006

(51) Int. Cl.
*G06K 7/10* (2006.01)

(52) U.S. Cl. ............. 235/454; 235/462.01; 235/462.25

(58) Field of Classification Search ............... 235/454, 235/462.01, 462.12, 462.25, 462.42, 462.45
See application file for complete search history.

(56) References Cited

U.S. PATENT DOCUMENTS

| | | | |
|---|---|---|---|
| 4,479,194 A | 10/1984 | Fogg et al. | 364/900 |
| 4,782,219 A | 11/1988 | Crater | 235/462 |
| 4,949,391 A | 8/1990 | Faulkerson et al. | 382/56 |
| 5,004,896 A | 4/1991 | Serrell et al. | 235/437 |
| 5,019,714 A | 5/1991 | Knowles | 250/568 |
| 5,155,343 A | 10/1992 | Chandler et al. | 235/462.45 |
| 5,354,977 A | 10/1994 | Roustaei | 235/472 |
| 5,365,597 A | 11/1994 | Holeva | 382/8 |
| 5,545,886 A | 8/1996 | Metlitsky et al. | 365/462 |
| 5,585,616 A * | 12/1996 | Roxby et al. | 235/462.06 |
| 5,981,944 A | 11/1999 | Ito | 250/235 |
| 6,006,990 A * | 12/1999 | Ye et al. | 235/454 |
| RE36,528 E | 1/2000 | Roustaei | 235/472.01 |
| 6,056,198 A | 5/2000 | Rudeen et al. | 235/462.24 |
| 6,061,091 A | 5/2000 | Van de Poel et al. | 348/241 |
| 6,123,261 A | 9/2000 | Roustaei | 235/472.1 |

(Continued)

OTHER PUBLICATIONS

Bajcsy, "Hydroinformatics Module 3: Data Processing and Analysis," Lesson 3: Spatial Registration (Oct. 2003).

(Continued)

*Primary Examiner*—Thien M. Le
*Assistant Examiner*—April A Taylor
(74) *Attorney, Agent, or Firm*—Stoel Rives LLP

(57) ABSTRACT

A data reader such as for example an imaging reader with a CCD or CMOS imager or the like, having multiple images of a target item illuminated or acquired from different directions in which the image signals are combined into a complete image of the item or selected portions of the item being read such that specular reflection (over-saturated regions of the sensor array) are minimized or eliminated. In one example data reader configuration, multiple illumination sources such as first and second rows of light emitting diodes (LED's) are aimed at the item being scanned from different directions. The illumination sources are alternately pulsed and return signals are collected at one or more sensor arrays. A selected non-saturated return signal from one of the illumination sources, or selected non-saturated portions of return signal from both of the illumination sources are processed to generate a complete non-saturated image of the target. In one preferred processing scheme, assuming that each of the LED's is capable of illuminating the entire target (e.g. a barcode), a pixel-by-pixel minimum is taken of the two images thereby producing an image with specular reflection minimized or nearly eliminated.

17 Claims, 5 Drawing Sheets

U.S. PATENT DOCUMENTS

| | | | | |
|---|---|---|---|---|
| 6,775,381 | B1 | 8/2004 | Nelson et al. | 380/54 |
| 6,817,525 | B2 * | 11/2004 | Piva et al. | 235/454 |
| 6,980,692 | B2 | 12/2005 | Chamberlain | 382/170 |
| 7,204,418 | B2 | 4/2007 | Joseph et al. | 235/454 |
| 7,204,420 | B2 | 4/2007 | Barkan et al. | 235/462.01 |
| 7,234,641 | B2 | 6/2007 | Olmstead | 235/454 |
| 2002/0067850 | A1 | 6/2002 | Williams et al. | 382/170 |
| 2002/0125411 | A1 | 9/2002 | Christy | 250/225 |
| 2003/0053686 | A1 | 3/2003 | Luo et al. | 382/165 |
| 2003/0222147 | A1 | 12/2003 | Havens et al. | 235/462.45 |
| 2004/0020990 | A1 | 2/2004 | Havens et al. | 235/462.45 |
| 2004/0164165 | A1 * | 8/2004 | Havens et al. | 235/462.43 |
| 2006/0043191 | A1 | 3/2006 | Patel et al. | 235/462.21 |
| 2006/0118628 | A1 | 6/2006 | He et al. | 235/454 |

OTHER PUBLICATIONS

Burschka et al., "Recent Methods for Image-Based Modeling and Rendering," *IEEE Virtual Reality 2003 Tutorial 1* (Mar. 2003).

Foley et al., "Computer Graphics: Principles and Practice," Addison-Wesley Publishing Company, Inc. (Jul. 1997).

Nielsen, "Bibliography on Image Registration," http://hendrix.imm.dtu.dk/staff/fnielsen/bib/Nielsen2001BibImage/Nielsen2001BibImage.html (Site visited Apr. 25, 1995).

Se et al., "Vision-Based Mapping With Backward Correction" (Oct. 2002).

Szeliski, "Image Alignment and Stitching" N. Paragios et al., editors, *Handbook of Mathematical Models in Computer Vision*, pp. 273-292. Springer (2005).

Xiong et al., "Registration, Calibration and Blending in Creating high Quality Panoramas" *IEEE Workshop on Applications of Computer Vision*, Princeton, New Jersey, pp. 69-74 (1998).

IBM Technical Disclosure Bulletin, vol. 25, No. 12, (May 1983), 3 pages.

* cited by examiner

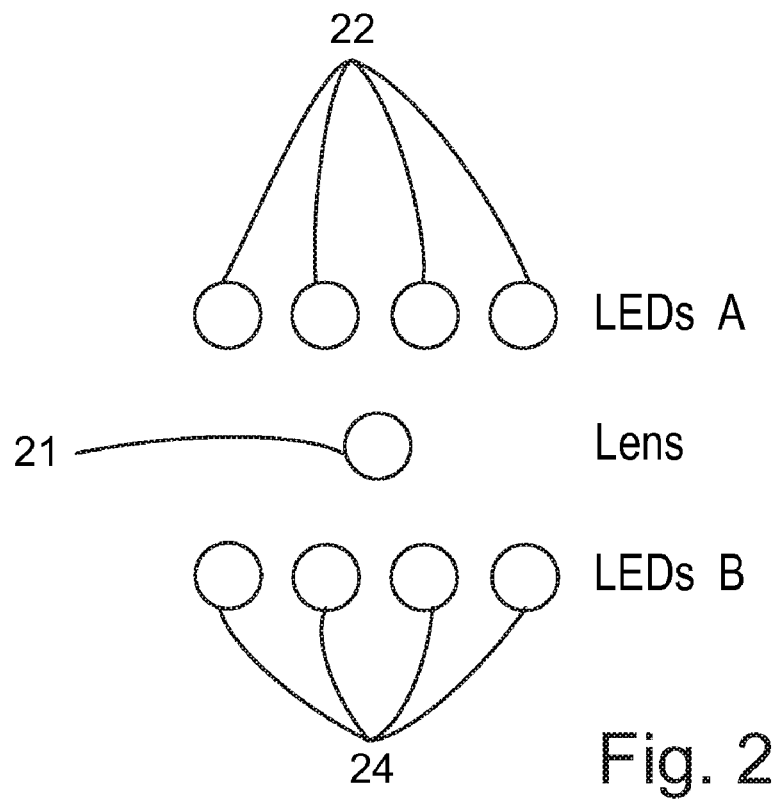
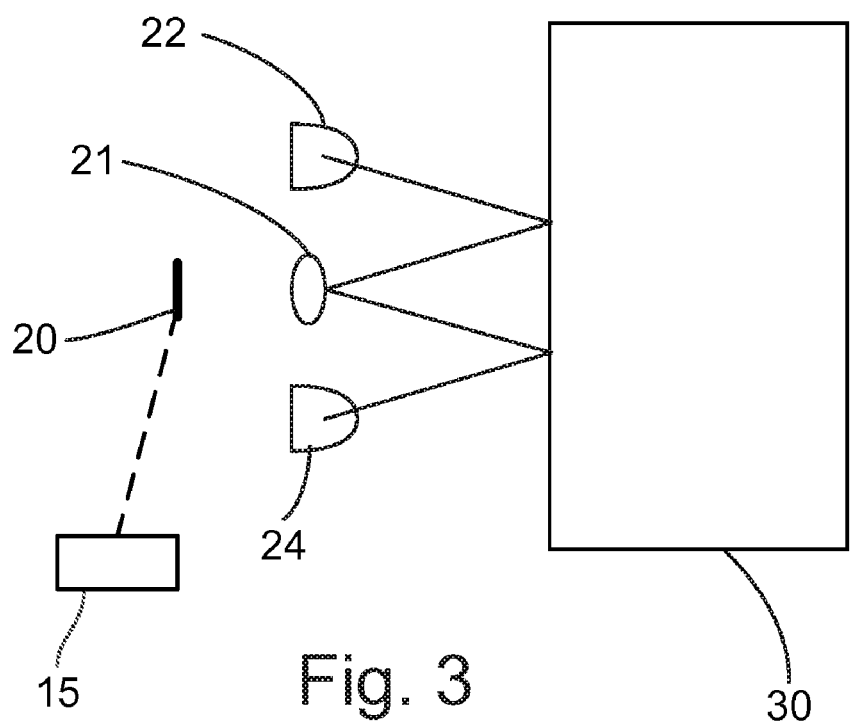

Pixel-By-Pixel Minimum

LEDs B (Bottom)

LEDs A (Top)

DATA READER AND METHODS FOR IMAGING TARGETS SUBJECT TO SPECULAR REFLECTION

BACKGROUND

The field of this disclosure relates to imaging and collection devices and in particular to methods and devices for illumination, collection and imaging for optical code reading and other data and image capture devices.

Image capture and other data reading devices are used to read optical codes, acquire data, and capture a variety of images. One common data acquisition device is an optical code reader. Optical codes typically comprise a pattern of dark elements and light spaces. There are various types of optical codes, including 1-D codes (such as UPC and EAN/JAN barcodes) and 2-D codes (such as PDF-417 and Maxicode). For convenience, some embodiments are described herein with reference to capture of 1-D barcodes. However, the embodiments may also be useful for other optical codes and symbols as well as other images such as fingerprint capture, and nothing herein should be construed as limiting this disclosure to optical codes or particular types of codes.

One type of data reader is an imaging reader that employs an imaging device or sensor array, such as a CCD (charge coupled device) or CMOS device. Imaging readers can be configured to read both 1-D and 2-D optical codes, as well as other types of optical codes or symbols and images of other items. When an imaging reader is used to read an optical code, an image of the optical code or portion thereof is focused onto a detector array. Though some imaging readers are capable of using ambient light illumination, an imaging reader typically utilizes a light source to illuminate the item being scanned, to provide the required signal response in the imaging device.

The present inventors have recognized that light from high-intensity illumination can reflect off certain surfaces such as metal cans creating a specular reflection of too high an intensity thereby oversaturating the sensor array resulting in ineffective detection. Thus, the present inventors have identified a need for compensating for this reflection condition to enhance data reader performance.

SUMMARY

Methods and devices are disclosed for improving reading of optical codes or other items being imaged, particularly where the read surface is reflective such that illumination tends to oversaturate the sensor array or portions thereof.

In a preferred configuration, the data reader comprises an imaging reader, such as a CCD or CMOS imager, having multiple images of a target item illuminated or acquired from different directions in which the signals are combined into a complete image of the item or selected portions of the item being read such that specular reflection (over-saturated regions of the sensor array) are minimized or eliminated. In one example data reader configuration, multiple illumination sources such as first and second rows of light emitting diodes (LED's) are aimed at the item being scanned from different directions. The illumination sources are alternately pulsed and return signals are collected at one or more sensor arrays. A selected non-saturated return signal from one of the illumination sources, or selected non-saturated portions of return signal from both of the illumination sources are processed to generate a complete non-saturated image of the target. In one preferred processing scheme, assuming that each of the LED's is capable of illuminating the entire target (e.g. a barcode), a pixel-by-pixel minimum is taken of the two images thereby producing an image with specular reflection minimized or nearly eliminated.

Additional aspects and advantages will be apparent from the following detailed description of preferred embodiments, which proceeds with reference to the accompanying drawings.

BRIEF DESCRIPTION OF THE DRAWINGS

FIG. 2 is a schematic front view of a layout for a data reader as in FIG. 1.

FIG. 3 is a schematic side view of a layout for a data reader as in FIGS. 1-2.

DETAILED DESCRIPTION OF PREFERRED EMBODIMENTS

Figure 1:
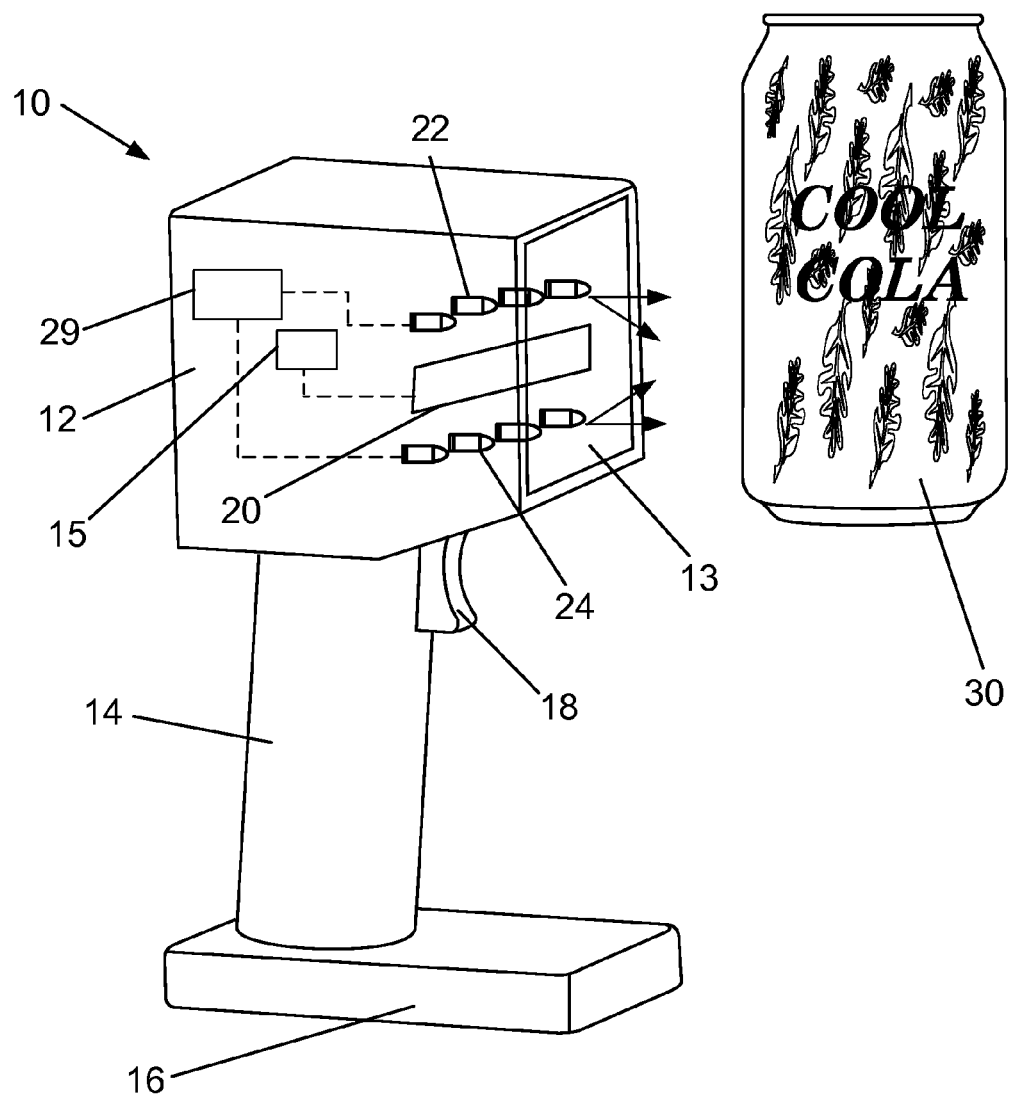
FIG. 1 diagrammatic view of a data reader according to a preferred embodiment.

Throughout the specification, reference to "one embodiment," or "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Furthermore, the described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments.

Preferred embodiments will now be described with reference to the drawings. To facilitate description, any reference numeral representing an element in one figure will represent the same element in any other figure.

Methods and devices according to the embodiments described are particularly useful for presentation scanners utilizing imaging technology. For conciseness of description, the detector arrays are described as CCD arrays, but other suitable detectors may be implemented such as CMOS.

FIG. 1 is a diagrammatic view of a data reader 10 in accordance with a first embodiment. The data reader 10 is schematically depicted as a presentation scanner suitable for reading optical codes, symbols or other items. Scanner 10 includes a head portion 12 attached to a handle portion 14, with the handle portion 14 mounted onto a base 16. Scanner 10 may operate as a presentation scanner being self-supported on a horizontal surface or mountable to such a surface or a wall. The reader 10 is self-supporting on the base 16 usable in a hands free mode. The reader 10 may also be grasped about the handle and operated in a hand-held or portable mode with scanning activated by actuation of the trigger 18. The reader may be operable in multiple modes or multiple read patterns as described in U.S. Pat. No. 6,575,368, hereby incorporated herein by reference. A bar code on an object such as beverage can 30 may be read by presenting the bar code into the scanner read region in front of the window 13. The data reader 10 has two rows of illumination sources in the top row 22 comprised in this embodiment of four LEDs arranged in a line above the detector 20. Similarly a second row of LEDs 24 is located in a similar position below the detector 20. In a preferred configuration, the first and second rows of LEDs 22, 24 are aimed into the scan region such that each row of LEDs each completely illuminates the bar code on the object 30 being presented to the data reader 10.

FIGS. 2-3 schematically illustrate front and side views of the data reader of FIG. 1. FIG. 2 illustrates the top row of LEDs 22 being comprised of four LEDs generally arranged in a line above the focusing lens 21. The focusing lens 21 collects light reflecting off the object 30 and focuses the return signal light onto the detector 20. The bottom row of LEDs 24 also comprises four LEDs generally arranged in a line below the lens 21. Other numbers of LEDs or arrangements may be utilized. In a preferred configuration, the top and bottom illumination sources 22, 24 are offset but directed toward the item being scanned to illuminate the same scan region or substantially overlapping scan regions.

When the item being read has a highly reflective surface such as the bar code on the side of the aluminum beverage can 30, the light from the illumination sources 22, 24 efficiently reflects off the metal surface and tends to oversaturate the detector 20 of the imaging system.

Figure 4:
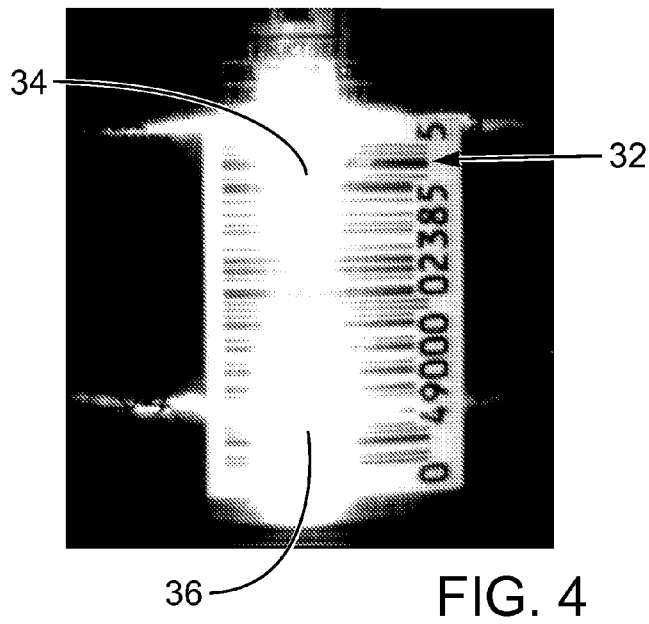
FIG. 4 is an image of a barcode on beverage can taken by the data reader as in FIGS. 2-3 with the barcode illuminated by both top and bottom rows of illumination sources.
Figure 6:
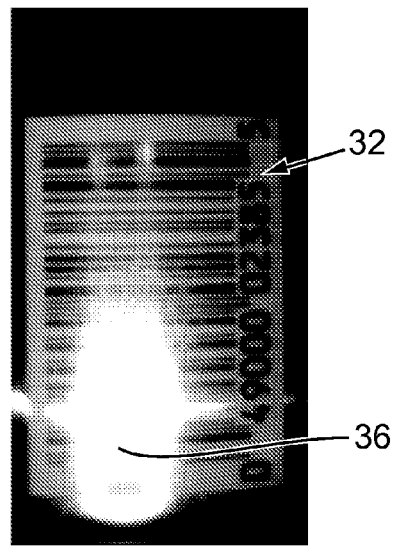
FIG. 6 is an image of the barcode on the beverage can taken by the data reader as in FIGS. 2-3 with the barcode illuminated by only the bottom row of illumination sources.
Figure 5:
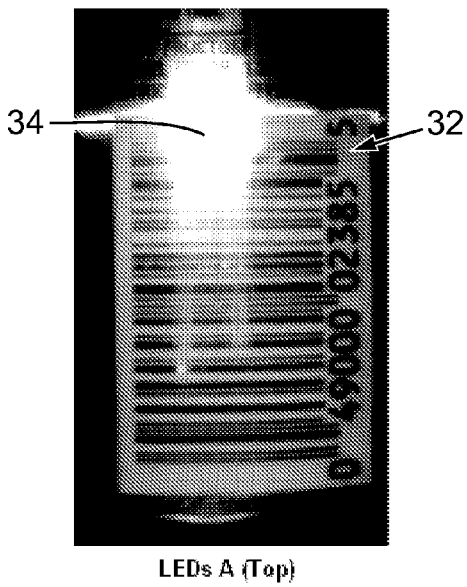
FIG. 5 is an image of a barcode on a beverage can taken by the data reader as in FIGS. 2-3 with the barcode illuminated by only the top row of illumination sources.

FIG. 4 illustrates an image of a bar code on the beverage can as taken by the data reader of FIGS. 2-3 with the bar code illuminated by both the top and bottom rows 22, 24. As shown in FIG. 4, the highly reflective metal surface of the can 30 efficiently reflects light from the illumination sources and oversaturates the detector resulting in regions 34, 36 of the image not being effectively read. The diffraction pattern caused by the microscopic vertical grooves in the can's surface caused by the forming process spreads horizontally in the image, preventing successful processing of the barcode image even in the regions to the left and right of the primary specular reflection. However, since the rows of LEDs 22, 24 are offset in opposite directions above and below the lens 21, the light from the two illumination sources 22, 24 are directed along different incoming angles to the surface of the bar code 32. FIG. 5 illustrates an image as detected at the detector 20 where only the top row of LEDs 22 is illuminated. As viewed in the figure only a top portion of the bar code label has an oversaturated region 34. In FIG. 6, images taken of the bar code 32 only illuminated by the bottom row of LEDs 24. FIG. 6 illustrates that only a bottom portion of the image experiences an oversaturation region 36.

Figure 7:
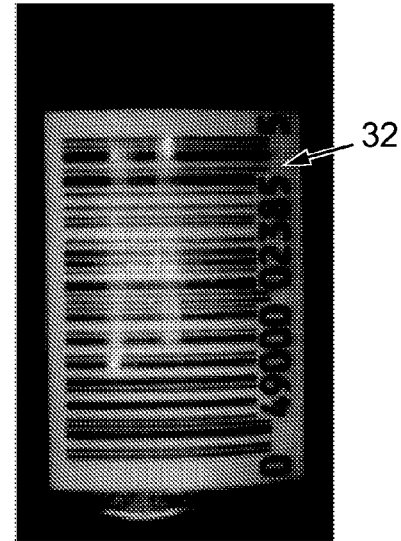
FIG. 7 is an image of the barcode on the beverage can combining the images of FIGS. 5 and 6 as processed by a pixel-by-pixel minimum scheme.

Examination of the images of FIGS. 5 and 6 reveals that the bottom portion of the bar code 32 in the image of FIG. 5 is relatively clear of oversaturation regions and the top portion of the bar code 32 in the image of FIG. 6 is relatively free of oversaturation regions at the top of the bar code. Thus by sequentially or alternatingly illuminating the bar code first with the top LED array 22 and acquiring the image of FIG. 5 and then subsequently illuminating the bar code only with the bottom LED array 24 and acquiring the image of the bar code of FIG. 6, the system may process the two images together to create a combined image of the bar code 32 as shown in FIG. 7.

In a preferred configuration where each row of LEDs 22, 24 is capable of illuminating the entire target (the bar code in this case) one preferred method is using a pixel-by-pixel minimum of the two images. In other words data from the two image scans are analyzed comparing the relative intensities of the pixel from the first image to the intensity of the pixel at the same spatial location in the second image, the algorithm selecting the image with the lower intensity thereby discarding a pixel that is experiencing specular reflection or otherwise oversaturating the detector. FIG. 7 illustrates a combination of the images of FIGS. 6 and 7 utilizing the pixel-by-pixel minimum selection criteria.

Once the image is acquired with the specular reflection being eliminated, the image may be processed to read the data captured (example the bar code) using a suitable methodology such as a virtual scan line system as disclosed in U.S. Pat. No. 5,635,699 hereby incorporated by reference.

Attention should be given to the choice of separation of illumination sources as such separation can improve system performance. In one configuration where the bar code is on the side of a beverage can, where the beverage can is being read in an orientation relative to the data reader as illustrated in FIG. 1 the curvature of the can would tend to reduce the separation of any sequential illumination where the rows of LEDs were arranged to the left and right of the sensor (as if the data reader 10 of FIG. 1 were rotated 90 degrees relative to the can 30). In addition the diffraction pattern caused by surface irregularities in the can would cause horizontal stripes that would not be readily eliminated by the processing method. Thus for beverage cans, the illumination orientations are preferably above and below the sensor 20 facing a vertically oriented can.

Figure 8:
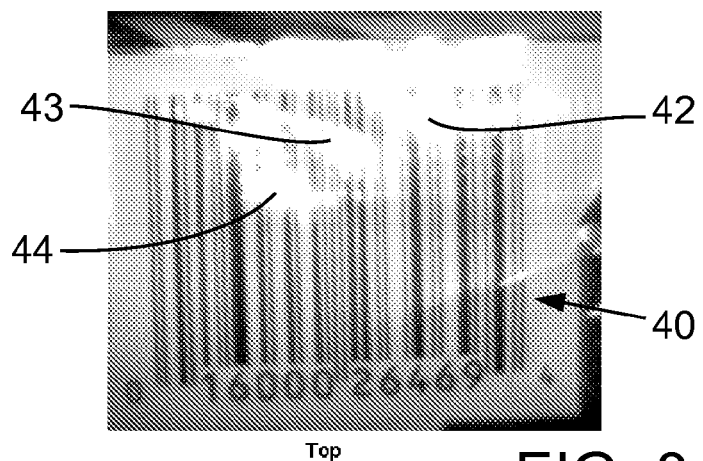
FIG. 8 is an image of a barcode on a reflective candy wrapper taken by the data reader as in FIGS. 2-3 with the barcode illuminated by only the top row of illumination sources.
Figure 9:
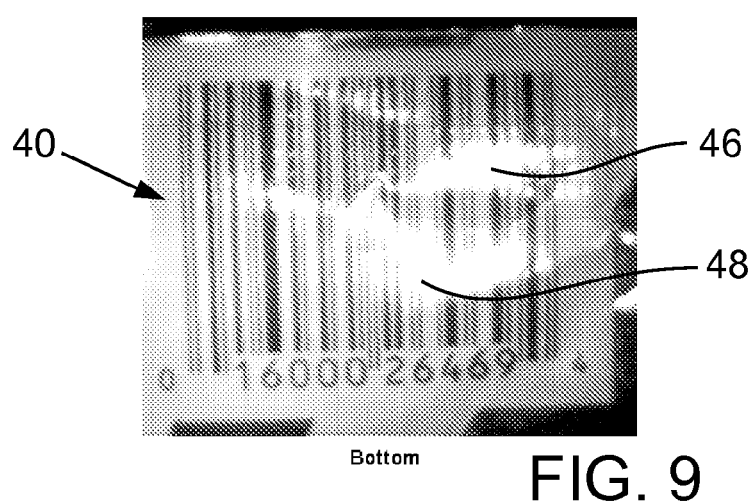
FIG. 9 is an image of the barcode on the candy wrapper taken by the data reader as in FIGS. 2-3 with the barcode illuminated by only the bottom row of illumination sources.
Figure 10:
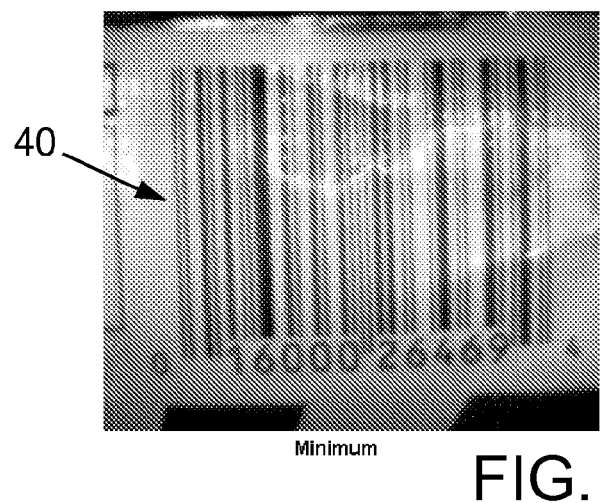
FIG. 10 is an image of the barcode on the candy wrapper combining the images of FIGS. 8 and 9 as processed by a pixel-by-pixel minimum scheme.

For other types of highly reflective labels the orientation of the illumination sources may not be critical or may have other orientation preferences. For example coded Mylar wrappers, such as candy bar wrappers, have high specular reflection. Since the wrappers are typically crinkled, there may be specular reflections in several places on the wrapper due to illumination in various directions. The sequential illumination may be from any two distinct orientations to achieve a desired effect. Objects with a flat surface, such as plate glass, may also have sequential illumination from any direction. FIGS. 8-9 illustrates an illumination method as applied to a bar code 40 on a candy wrapper. FIG. 8 illustrates the bar code 40 being illuminated solely by the top row of LEDs 22 whereby the image experiences three (or more) oversaturation regions 42, 43, 44. FIG. 9 illustrates an image of the bar code 40 as illuminated solely by the bottom row of LEDs 22, the image experiencing oversaturation regions 46, 48. In the two images of FIGS. 8 and 9 via the pixel-by-pixel minimum processing method as previously described generating an image of the bar code 40 as in FIG. 10 whereby the specular reflection is substantially removed.

To achieve a desirably rapid sweep speed, it is preferred that the two images be taken as close together in time as practical. One method of taking the pixel minimum of two frames may assume that there is no movement between the frames. Since the exposure time of an LED imager designed for moving targets is quite small, the time delay from frame to frame is dominated by the readout time of the images. To reduce the readout time, it may be advantageous to reduce the area of the image to be read out to contain only the region of interest. For example, in FIG. 3, a narrow vertical stripe of pixels may be all that is needed to be read since the bar code is oriented in such a way that a vertical scan line would cross all of the bars and spaces of the bar code. By reducing the number of pixels to be read, the readout time is greatly reduced, thereby reducing the time delay between frames and more ideally meeting the assumption of no motion between the frames.

One way of processing these portions of the images efficiently may be by storing the first frame, or a subset of the frame according to a virtual scan line processing method such as disclosed in U.S. Pat. No. 5,635,699 (already incorporated by reference) in memory. As the second frame is read out of the imager, each pixel is compared to the pixel stored from the previous frame. If the new pixel is smaller, it is stored in the same location in place of the pixel of the previous frame. Otherwise the pixel of the previous frame is left in memory. This process uses a simple yes/no decision when choosing each pixel as between two images.

Alternate processing schemes may be utilized. In theory, the signal level at a particular pixel location has a preferred intensity range. When the sensor has oversaturated pixels or regions, the intensity is too high indicative of specular reflection. In alternate process, the intensities of the pixels from the first frame (or a subset of the frame according to a virtual scan line processing method) are stored, in memory. As the second frame is read out of the imager, the pixels of the first frame and the pixel from the second frame are compared to a preferred intensity range and the lower intensity pixel is chosen unless that pixel has too low an intensity and the upper intensity pixel is not above a maximum intensity.

The data reader 10 preferably comprises an imaging reader having a suitable detector array 20 such as a complementary metal oxide semiconductor (CMOS) imager. The imager is coupled to a processor (shown diagrammatically as element 15 in FIG. 3) for reading optical codes and other symbols or imaged items such as a fingerprint. A CMOS imager has a field of view inclusive of scan zone within which a target item may be presented for imaging. A CMOS imager may comprise an active-pixel imaging sensor with a global shutter (simultaneous total-pixel exposure system—also referred to as "frame shutter exposure") and good near infrared (NIR) sensitivity, such as a model MT9V022 sensor sold by Micron Technology, Inc. of Boise, Id., USA. In some embodiments, multiple CMOS imagers may be employed for reading items in multiple different read volumes, of which some volumes may overlap.

The processor 15 may comprise any suitable digital processor, such as a low-power DSP core or ARM core processor. In preferred embodiments, processor 15 comprises an OMAP processor sold by Texas Instruments of Dallas, Tex., USA or an i.MX1 series processor (such as the MC9328MX1 processor) sold by Freescale Semiconductor, Inc. of Austin, Tex., USA. Alternately, multiple processors or sub-processors or other types of processor electronics such as comparators or other specific function circuits may be used alone or in combination. For the purposes of this description, the term processor is meant to any of these combinations.

In other embodiments (not shown), data reader 10 may comprise other types of data readers, such as a moving spot laser scanner, for example. Data reader 10 may also comprise a dual-mode scanner, such as the kind described in U.S. Pat. No. 6,575,368, already incorporated by reference.

The illumination sources preferably comprises a collection of infrared or visible spectrum LEDs, but may alternatively comprise another kind of light source, such as a lamp or laser diode, for example. An infrared source preferably emits diffuse infrared radiation at a near-infrared wavelength of about 850 nm, although non diffuse sources and sources of other wavelengths may also be used. The illumination sources may be coupled to and controlled by the processor 15, or may be remotely mounted and powered. A power supply circuit shown schematically as element 29 is preferably provided for energizing the LEDs. The top and bottom LED arrays 22, 24 are preferably both pulsed in alternating succession or at suitable rates and/or times.

Figure 11:
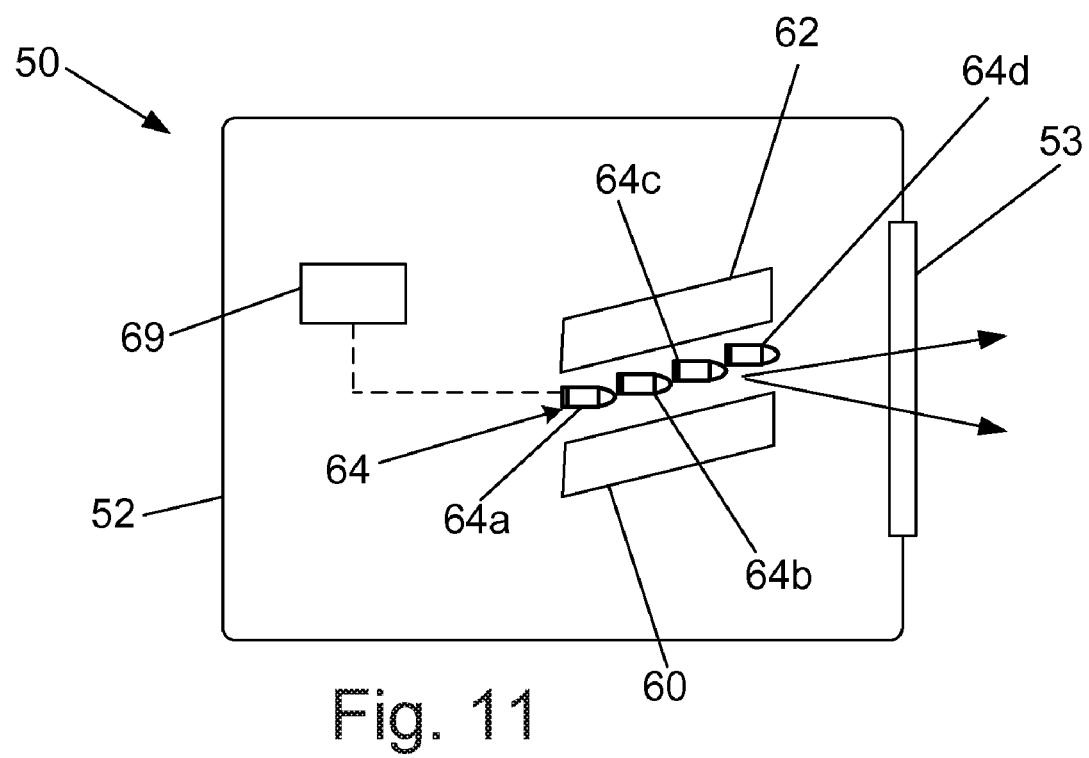
FIG. 11 diagrammatic view of a data reader according to another embodiment.

In an alternate system, the configuration of the sensor and illumination sources are reversed. FIG. 11 illustrates an alternate data reader 50 comprised of a scan head 52 with single row of LEDs 64 located between first and second sensor arrays 60, 62. The light source 64 is pulsed and directed out through window 53 and reflected light from the same pulse is detected by the first and second sensor arrays 60, 62. The angle of reflection from the light source to each of the sensors will be different. Thus where an image region sensed by the first sensor array 60 experiences specular reflection, the corresponding image region sensed by the second sensor 62 array may not. Corresponding pixels of the two images (or a subset thereof according to a virtual scan line processing method) are compared and the pixel with the lower intensity is selected. The resulting pixel image is stored or sent for processing/decoding. One advantage of this system may be that both sensor arrays record an image at the same instant, so there is no concern about product movement between captured images. However, in a general case, processing will likely be required in order to resolve the parallax issue between the sensors, i.e., determine which pixels in the first sensor are imaging the same location as pixels in the second sensor. In various applications, one variable, the motion between frames, or the parallax between imagers may be controlled in such a fashion so as to prefer the use of one embodiment over another.

Alternately, the systems may be combined. The LEDs 64 may be controlled by a controller 69 to illuminate at different times. For example, left side LEDs 64a, 64b may illuminate first with the image captured by one or both sensors 60, 62 and then right side LEDs 64c, 64d may illuminate second with the image captured by one or both sensors 60, 62.

Thus systems and methods for data reading and image capture that reduce specular reflection or compensate for signal oversaturation have been shown and described. It is nevertheless intended that modifications to the disclosed systems and methods may be made by those skilled in the art without departing from the underlying principles of set forth herein. The scope of the present invention should, therefore, be determined only by the following claims.

The invention claimed is:

1. A method of data reading comprising the steps of:
passing an item to be read into a scan region;
offsetting a first illumination source from a second illumination source;
at a first point in time, illuminating a first portion of the scan region with the first illumination source and acquiring a first image of the item;
at a second point in time subsequent to the first point in time, illuminating a second portion of the scan region with the second illumination source and acquiring a second image of the item, the first portion and the second portion being at least partly overlapping;

comparing a discrete portion of the first image to a corresponding discrete portion of the second image and selecting that discrete portion having a lower intensity;

repeating said step of comparing for each of the discrete portions of the first and second images;

assembling a combined image of the item from the selected discrete portions;

processing the combined image.

2. A method according to claim 1 wherein the first illumination source is a row of LEDs.

3. A method according to claim 1 further comprising a sensor array positioned between the first illumination source and the second illumination source.

4. A method according to claim 3 wherein the first illumination source is a row of LEDs positioned above sensor array and the second illumination source is a row of LEDs positioned below the sensor array.

5. A method according to claim 1 wherein the step of comparing comprises comparing incoming signal of the second image on a pixel-by-pixel basis to the pixels of the first image at corresponding spatial locations.

6. A system for data reading of an item within a scan region, comprising:
   a first illumination source that directs a first illumination onto a surface of the item in the scan region from a first direction;
   a second illumination source that directs a second illumination onto the surface of the item in the scan region from a second direction different than first direction;
   a controller for alternately activating the first illumination source and the second illumination source;
   a sensor for detecting a first return signal from the first illumination reflecting from the item and for detecting a second return signal from the second illumination reflecting from the item;
   a processor for comparing relative intensities of corresponding discrete portions of the first and second return signals, choosing a selected one of the discrete portions having a lower intensity, and combining the signals into a complete image of the item or selected portions of the item being read.

7. A system according to claim 6 wherein the system comprises a presentation scanner.

8. A system according to claim 6 wherein the complete image of the item or selected portions of the item being read is a plurality of virtual scan lines representative of the image within the scan region.

9. A system according claim 6 wherein the discrete portion being compared comprises a specific pixel location on the sensor, the processor performing a pixel-by-pixel comparison of the first and second return signals and choosing the return signal for each specific pixel location having a lower intensity.

10. A system according claim 6 wherein the processor combines the signals by selecting the discrete portions having an intensity in a preferred intensity range.

11. A system for data reading of an item within a scan region, comprising:
   a first illumination source that directs a first illumination onto a surface of the item in the scan region;
   a first sensor array arranged offset from the first illumination source in a first direction for detecting a first return signal from the first illumination reflecting from the item;
   a second sensor array arranged offset from the first illumination source in a second direction for detecting a second return signal from the first illumination reflecting from the item;
   processor for comparing relative intensities of discrete portions of the first and second return signals and combining the signals into a complete image of the item or selected portions of the item being read,
   wherein the processor combines the return signals by choosing a selected one of the discrete portions of the first and second return signals having a lower intensity.

12. A system according claim 11 wherein the processor chooses a selected one of the first and second discrete portions depending on the comparing.

13. A system according claim 11 wherein the processor combines the return signals by selecting the discrete portions having an intensity in a preferred intensity range.

14. A system for data reading of an item within a scan region, comprising:
   a first illumination source that directs a first illumination onto a surface of the item in the scan region;
   a first sensor array arranged offset from the first illumination source in a first direction for detecting a first return signal from the first illumination reflecting from the item;
   a second sensor array arranged offset from the first illumination source in a second direction for detecting a second return signal from the first illumination reflecting from the item;
   processor for comparing relative intensities of discrete portions of the first and second return signals and combining the signals into a complete image of the item or selected portions of the item being read,
   wherein the discrete portion being compared comprises a specific pixel location on the sensor array, the processor performing a pixel-by-pixel comparison of the first and second return signals and choosing the return signal for each specific pixel location having a lower intensity.

15. A method of data reading comprising the steps of:
   offsetting a first image array from a second image array;
   illuminating a first portion of a scan region with a first illumination source and acquiring a first image of an item with the first sensor array from a first angular direction and acquiring a second image of the item with the second sensor array from a second angular direction different than the first angular direction;
   comparing a discrete portion of the first image to a corresponding discrete portion of the second image and selecting that discrete portion being less subjected to specular reflection;
   repeating said steps of illuminating and comparing for each of the discrete portions of the first and second images of the item;
   assembling a combined image of the item from the selected discrete portions;
   processing the combined image,
   wherein the step of comparing comprises performing a pixel-by-pixel comparison between the first and second images.

16. A method according to claim 15 wherein the step of selecting that discrete portion being less subjected to specular reflection comprises choosing the discrete portion having a signal of lower intensity.

17. A method according to claim 15 wherein the step of selecting that discrete portion being less subjected to specular reflection comprises selecting the discrete portion having a signal of an intensity in a preferred intensity range.

* * * * *

UNITED STATES PATENT AND TRADEMARK OFFICE
CERTIFICATE OF CORRECTION

PATENT NO. : 7,398,927 B2
APPLICATION NO. : 11/044825
DATED : July 15, 2008
INVENTOR(S) : Olmstead et al.

Page 1 of 1

It is certified that error appears in the above-identified patent and that said Letters Patent is hereby corrected as shown below:

Column 2
Line 10, before "diagrammatic" insert --is a--.
Line 39, before "diagrammatic" insert --is a--.

Column 3
Line 65, after "32" insert --are--.

Column 4
Line 55, change "illustrates" to --illustrate--.
Line 61, change "in" to --combining--.
Line 63, change "generating" to --generates--.

Column 5
Line 65, after "meant to" insert --apply to--.

Column 6
Line 54, delete "of".

Signed and Sealed this

Thirty-first Day of March, 2009

JOHN DOLL
*Acting Director of the United States Patent and Trademark Office*